(12) United States Patent
Kim et al.

(10) Patent No.: US 7,255,453 B2
(45) Date of Patent: Aug. 14, 2007

(54) DIRECT TYPE BACKLIGHT UNIT AND LIQUID CRYSTAL DISPLAY DEVICE HAVING THE SAME

(75) Inventors: Jae Bum Kim, Daegu-si (KR); Yong Yun Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 82 days.

(21) Appl. No.: 11/153,352

(22) Filed: Jun. 16, 2005

(65) Prior Publication Data

US 2005/0281051 A1    Dec. 22, 2005

(30) Foreign Application Priority Data

Jun. 18, 2004    (KR)    ............ 10-2004-0045286

(51) Int. Cl.
*G01D 11/28* (2006.01)
*F21V 19/02* (2006.01)
*F21V 7/04* (2006.01)
*H01J 1/62* (2006.01)

(52) U.S. Cl. ............ 362/29; 362/614; 362/285; 362/634; 313/493

(58) Field of Classification Search ............ 362/613, 362/614, 634, 632, 97, 29; 313/364, 234, 313/607, 493, 634, 635, 573; 349/70, 61
See application file for complete search history.

(56) References Cited

U.S. PATENT DOCUMENTS

| 6,527,414 | B2 * | 3/2003 | Moon ............ 362/249 |
| 6,674,250 | B2 * | 1/2004 | Cho et al. ............ 315/291 |
| 6,805,464 | B2 * | 10/2004 | Moon et al. ............ 362/235 |
| 6,843,584 | B2 * | 1/2005 | Bang et al. ............ 362/249 |
| 6,939,019 | B2 * | 9/2005 | Choi et al. ............ 362/613 |
| 7,086,753 | B2 * | 8/2006 | Lin et al. ............ 362/225 |
| 7,086,774 | B2 * | 8/2006 | Katsuda et al. ............ 362/634 |

* cited by examiner

*Primary Examiner*—Sandra O'Shea
*Assistant Examiner*—Sean P Gramling
(74) *Attorney, Agent, or Firm*—McKenna Long & Aldridge LLP

(57) ABSTRACT

A liquid crystal display device includes a liquid crystal display panel including an upper substrate, a lower substrate attached to the upper substrate, and a liquid crystal layer between the upper and lower substrates, a backlight unit disposed at a back side of the liquid crystal display panel, the backlight unit including a plurality of lamps, each of the lamps having a quadrangular-like shape and two external electrodes at two ends thereof, respectively, and a bottom cover holding the plurality of lamps.

18 Claims, 7 Drawing Sheets

DIRECT TYPE BACKLIGHT UNIT AND LIQUID CRYSTAL DISPLAY DEVICE HAVING THE SAME

The present invention claims the benefit of Korean Patent Application No. 45286/2004 filed in Korea on Jun. 18, 2004, which is hereby incorporated by reference.

BACKGROUND OF THE INVENTION

1. Field of the Invention

The present invention relates to a liquid crystal display (LCD) device, and more particularly, to a direct type backlight unit and an LCD device having the same that have a reduced number of lamps and an external electrode having an extended longitudinal length.

2. Discussion of the Related Art

A cathode ray tube (CRT) device, one of the most widely used display devices, has been used in televisions, measurement instruments, and information terminals, but a CRT device has a relatively heavy weight and a large size. Thus, a CRT device cannot actively meet the current small-sizing and lightweight product requirements.

To replace such a CRT device, an LCD device having the advantages of small size, light-weight, and low power consumption has actively developed. In addition, an LCD device can provide a high contrast ratio for displaying a gray scale or a moving image. Thus, an LCD device has expanded applications as a display device.

However, since an LCD device does not generate light by itself, it requires a separate external light source for generating light. Thus, an LCD device displays an image by controlling light generated by the external light source, e.g., a backlight unit, that is illuminated on an LCD panel.

In general, the backlight units are classified into an edge type and a direct type according to the position of a light source relative to a display plane. In particular, the direct type backlight unit has a high light use rate, imposes no limitation in the size of the display plane and can be easily handled. Thus, the direct type backlight unit is widely used for a large-sized LCD device, e.g., an LCD device of more than 30 inches.

The direct type backlight unit does not require a light guide for converting linear light from a lamp into plane light and includes a plurality of lamps provided at a lower portion of the display plane, a reflection sheet for reflecting light from the lamp to the display plane to prevent light loss, and a diffuser plate for scattering the light to an upper side of the lamps to emit light uniformly. The lamps include one of a point light source, such as an incandescent lamp and a white halogen lamp, a linear light source, such as a hot cathode fluorescent lamp, a cold cathode fluorescent lamp, and an external electrode fluorescent lamp (EEFL), and a planar light source, such as an LED of a matrix shape.

Currently, the cold cathode fluorescent lamp (CCFL) is mainly used, but an external electrode florescent lamp (EEFL) is gradually replacing the CCFL. Since an EEFL has brightness of more than 400 nit, which is 60% greater than brightness of a CCFL, the EEFL can expand the TFT-LCD application field such as TV. In addition, unlike a CCFL having electrodes within lamps, an EEFL has external electrodes and thus is advantageous in operating in parallel, such that a uniform brightness can be realized by reducing a voltage deviation between the lamps. Further, inverters that are required for driving a plurality of EEFLs can be reduced because EEFLs have external electrodes. As a result, the number of parts of the backlight unit is reduced, and the manufacturing cost and the weight of the LCD module can be remarkably reduced.

FIG. 1 is an exploded perspective view illustrating a direct type backlight unit of an LCD device according to the related art. In FIG. 1, a direct type backlight unit 100 includes a plurality of lamps 101, a bottom cover 102 for seating the plurality of lamps 101 at an interval, a reflection sheet 103 disposed under the lamps 101 for reflecting light generated from the lamps 101 to a front side of the backlight unit 100, a diffuser plate 105 disposed on the lamps 101 for diffusing light, and a diffuser sheet 106 disposed on the diffuser plate 105 for enhancing the diffusion of light. The lamps 101 are linear lamps, and the direct type backlight assembly 100 does not separately require a light guide.

FIG. 2 is an exploded perspective view illustrating a linear type lamp unit of the direct type backlight unit shown in FIG. 1, and FIG. 3 is a plan view illustrating the lamp unit shown in FIG. 2. As shown in FIGS. 2 and 3, external electrodes 101a and 101b for applying a drive voltage are attached at both ends of the plurality of linear type EEFLs 101. The lamp unit also includes lamp support members 201, 202, 203, and 204 having holes 201a, 202a, 203a, and 204a for receiving the external electrodes 101a and 101b at both sides of the lamps 101. The lamp support members 201, 202, 203, and 204 have conductive layers 201b, 202b, 203b, and 204b for applying a voltage.

In addition, the external electrodes 101a and 101b form a bezel region, shown as shaded portions of the lamps 101, that blocks light. In particular, each of the external electrodes 101a and 101b has a length corresponds to a width of the holes 201a, 202a, 203a, and 204a, and has a width extending beyond the lamp support members 201, 202, 203, and 204 to supply a sufficient current to drive the lamp. However, when the width of each of the external electrodes 101a and 101b is extended in order to drive the EEFL, the bezel region also is widened. As a result, a non-light-emitting region also is widened, thereby reducing an effective light-emitting region of the backlight unit.

SUMMARY OF THE INVENTION

Accordingly, the present invention is directed to a direct type backlight unit and a liquid crystal display device having the same that substantially obviate one or more of the problems due to limitations and disadvantages of the related art.

An object of the present invention is to provide a direct type backlight unit and an LCD device having the same that have a reduced number of lamps and an external electrode having an extended longitudinal length completely overlapping support members.

Another object of the present invention is to provide a direct type backlight unit and LCD device having the same that have lamps arranged in a quadrangle-like form.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a direct type backlight unit includes a plurality of lamps each having a first edge and a second edge, the first edges and the second edges of at least two lamps are respectively connected together, wherein an external electrode is provided at the connected portion, and a bottom cover holding the plurality of lamps.

In another aspect, a liquid crystal display device includes a liquid crystal display panel including an upper substrate, a lower substrate attached to the upper substrate, and a liquid crystal layer between the upper and lower substrates, a backlight unit disposed at a back side of the liquid crystal display panel, the backlight unit including a plurality of lamps, each of the lamps having a quadrangular-like shape and two external electrodes at two ends thereof, respectively, and a bottom cover holding the plurality of lamps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
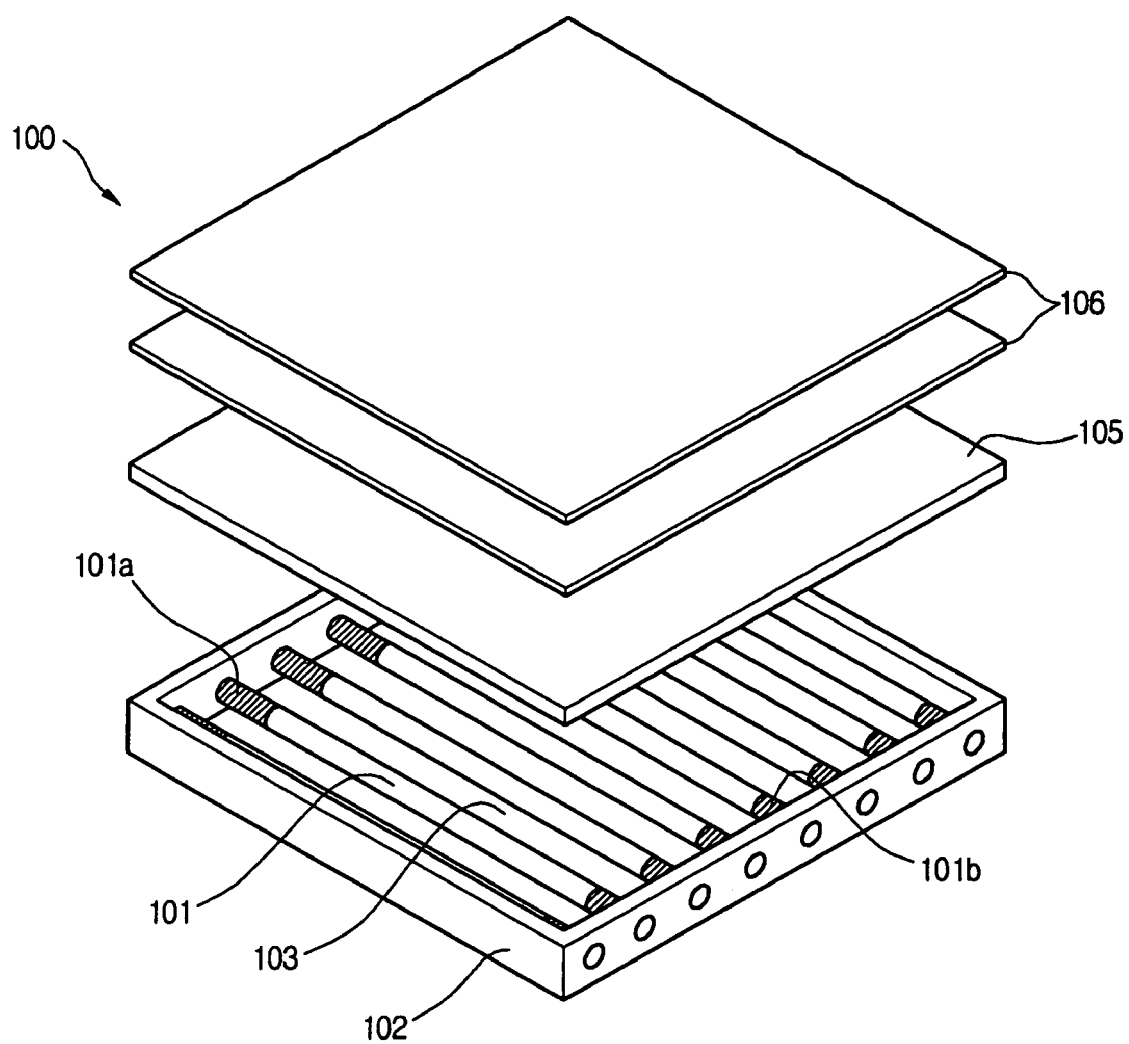
FIG. 1 is an exploded perspective view illustrating a direct type backlight unit of an LCD device according to the related art.
Figure 2:
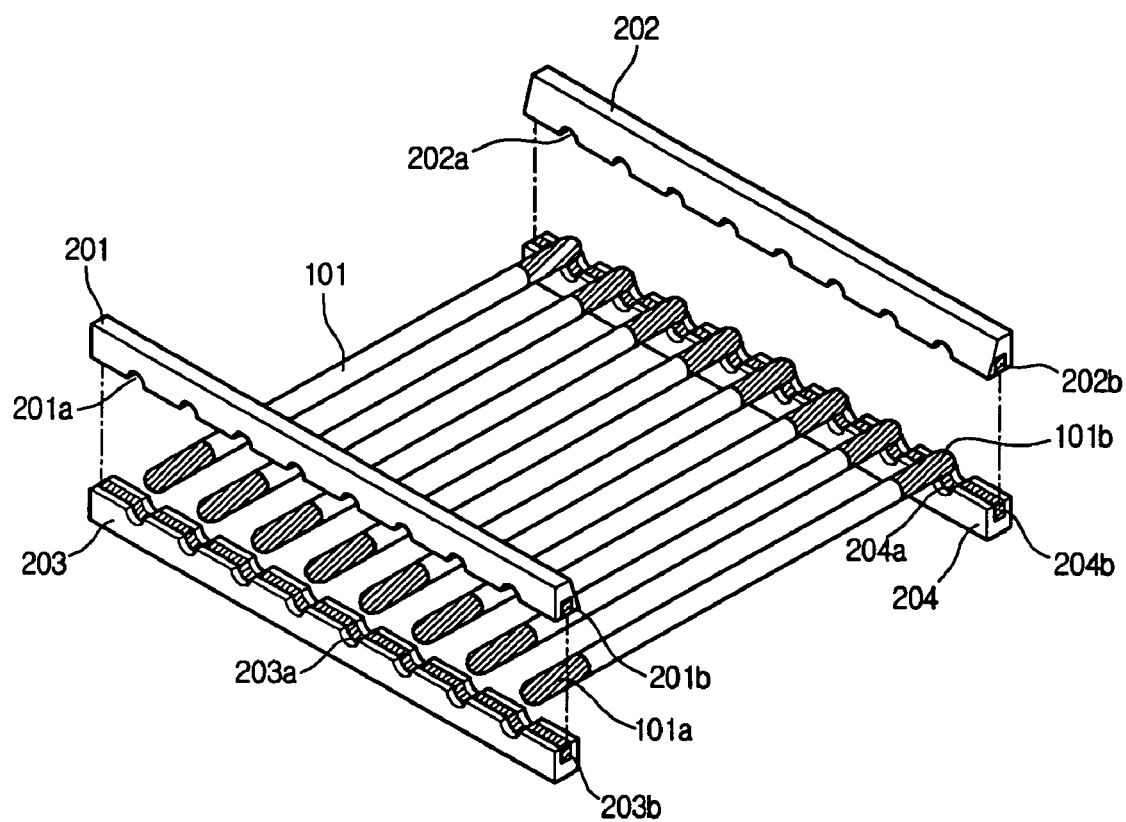
FIG. 2 is an exploded perspective view illustrating a linear type lamp unit of the direct type backlight unit shown in FIG. 1.
Figure 3:
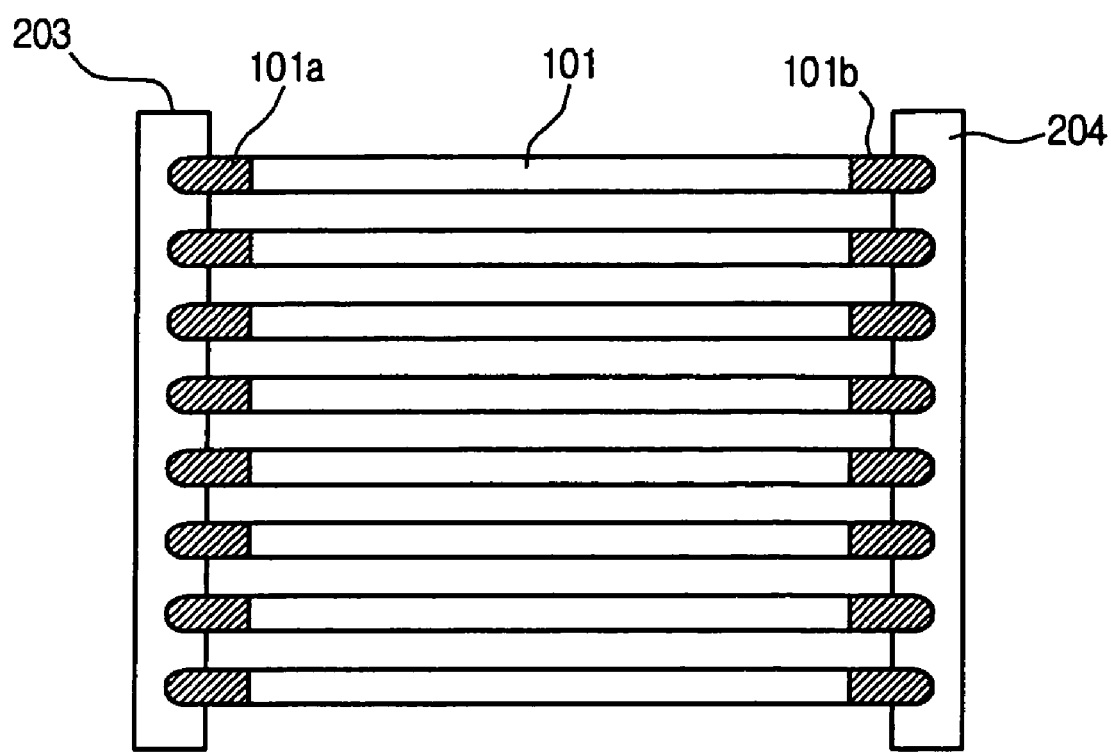
FIG. 3 is a plan view illustrating the lamp unit shown in FIG. 2.
Figure 4:
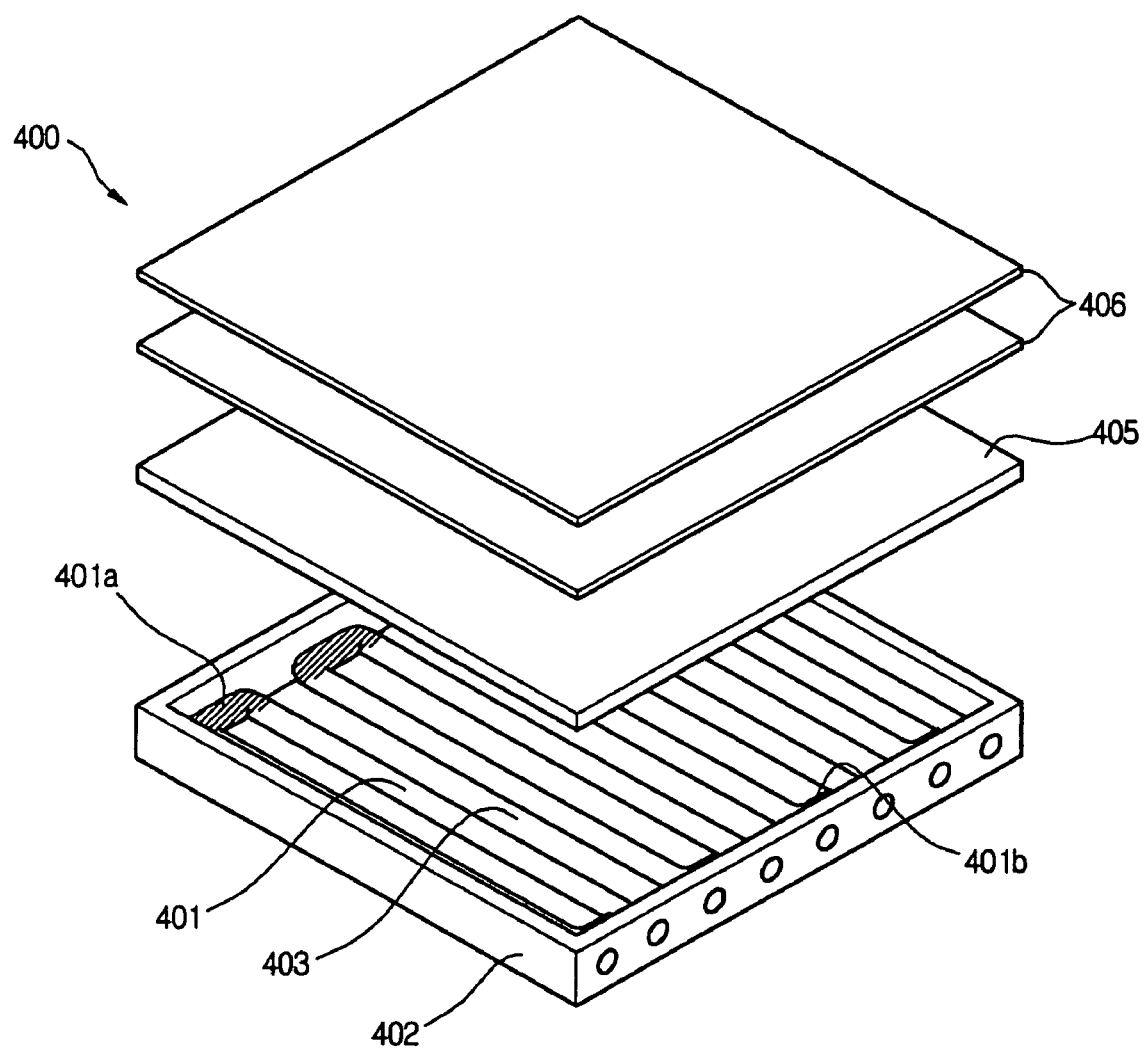
FIG. 4 is an exploded perspective view schematically illustrating a direct type backlight unit of an LCD device according to an embodiment of the present invention.

FIG. 4 is an exploded perspective view schematically illustrating a direct type backlight unit of an LCD device according to an embodiment of the present invention. In FIG. 4, a direct type backlight unit 400 includes a plurality of lamps 401, a plurality of external electrodes 401a and 401b, a bottom cover 402, and a reflector 403. In particular, the bottom cover 402 holds the lamps 401. Each of the lamps 401 may include two lamps incorporated in parallel to each other having a predetermined interval therebetween. The external electrodes 401a and 401b are respectively formed at two ends of each of the lamps 401.

The bottom cover 402 also holds the reflector 403 for reflecting light generated from the lamps 401 to a front side of the backlight unit 400. As a result, the reflector 403 improves light efficiency of the backlight unit 400 by reflecting the light emitted and lost at a lower side of the lamp 401 to the front side of the backlight unit 400.

In addition, the backlight unit 400 may include a plurality of optical sheets stacked on an upper side of the lamps 401. For example, the backlight unit 400 may include a diffuser sheet 406 for diffusing the light generated from the lamps 401, a condensing sheet 405 for condensing light to up/down and left/right directions to enhance brightness, a protector (not shown) for protecting the condensing sheet 405, and a prism sheet (not shown) for providing a wide viewing angle, sequentially disposed on the upper side of the lamps 401.

Figure 5:
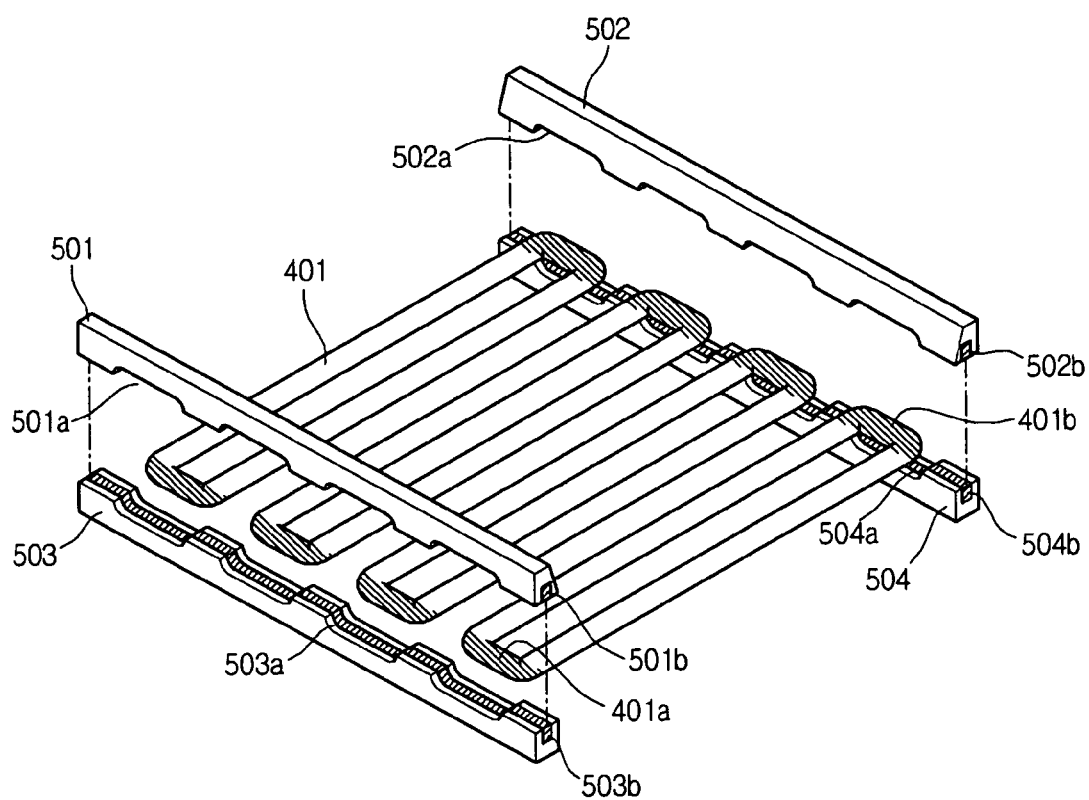
FIG. 5 is an exploded perspective view schematically illustrating a lamp unit of the backlight unit according to an embodiment of the present invention.

FIG. 5 is an exploded perspective view schematically illustrating a lamp unit of the backlight unit according to an embodiment of the present invention. In FIG. 5, a lamp unit includes a plurality of quadrangular-like shaped lamps 401, first and second upper supports 501 and 502, first and second lower supports 503 and 504, and conductive layer 501b, 502b, 503b, and 504b.

In addition, the first and second lower supports 503 and 504 are spaced at a predetermined distance to correspond to the length of the lamps 401. The first and second lower supports 503 and 504 have a plurality of grooves 503a and 504a formed on one side thereof. In particular, the grooves 503a and 504a may receive and hold the ends of the lamps 401.

The upper supports 501 and 502 may have the same structure as the lower supports 503 and 504. For example, the first and second upper supports 501 and 502 may be spaced at the same distance apart from each other as the first and second lower supports 503 and 504 are spaced from each other. The first and second upper supports 501 and 502 have a plurality of grooves 501a and 502a. The grooves 501a and 502a of the upper supports 501 and 502 may correspond to the grooves 503a and 504a of the lower support 503 and 504. Further, the combination of the first and second lower supports 503 and 504 and the first and second upper supports 501 and 502 fix and support the lamps 401.

The grooves 503a and 504a of the first and second lower supports 503 and 504 and the grooves 501a and 502a the first and second upper supports 501 and 502 may be formed in a passing through manner, such that the ends of the lamps 401 may be exposed to the outside when the supports 501, 502, 503, 504 are coupled to each other. The shape and size of the grooves 501a, 502a, 503a, and 504a may be the same as the shape and size of the lamps 401. For example, the first and second lower supports 503 and 504 may receive one half of the lamp diameter, and the first and second upper supports 501 and 502 may receive the other half of the lamp diameter.

Figure 6:
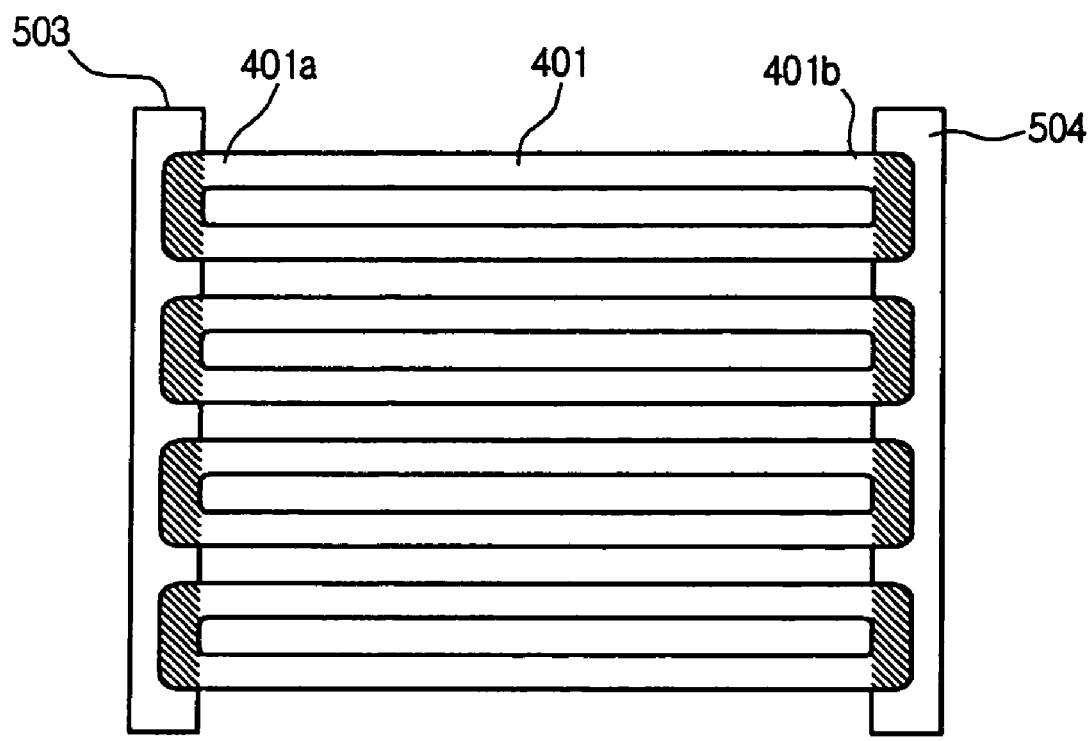
FIG. 6 is a plan view schematically illustrating the lamp unit shown in FIG. 5.

The conductive layers 501b, 502b, 503b, and 504b are formed on the planes where the grooves 501a, 502a, 503a, and 504a are formed to supply power to the lamps 401. The conductive layers 501b, 502b, 503b, and 504b are formed after forming grooves in the lengthwise direction of the supports, by burying a conductive material in the grooves or by coating the conductive material on the planes where the grooves are formed. Thus, the conductive layers 501b, 502b, 503b, and 504b respectively provide power connections for connecting the external electrodes 401a and 401b of one of the lamps 401 with the external electrodes 401a and 401b of another of the lamps 401. The external electrodes 401a and 401b completely overlap the supports 501, 502, 503, and 504, and do not extend into an effective light-emitting region of the backlight unit FIG. 6 is a plan view schematically illustrating the lamp unit shown in FIG. 5. As shown in FIG. 6, each of the quadrangular-like shaped lamps 401 may have two substantially linear lamps arranged parallel to each other with a predetermined space therebetween. In addition, the two substantially linear lamps may have ends bent once and merged together, and the external electrodes 401a and 401b may be formed at the merged portions of the two substantially linear lamps.

The external electrodes 401a and 401b formed at both ends of the lamps 401 may have a narrow horizontal width but a relatively large longitudinal length, such that the external electrodes 401a and 401b have an extended length along the lengthwise direction of first and second lower supports 503 and 504. For example, the longitudinal length of the longitudinal portion of external electrodes 401a and 401b may correspond to a longitudinal length of each of the quadrangular lamps 401. The longitudinal length of each of the quadrangular lamps 401 may be the combination of the width of each of the two substantially linear lamps and the predetermined space between the two substantially linear lamps.

Thus, since the external electrodes 401a and 401b have the narrow horizontal width, the resultant bezel region also has a narrow width and a relatively large longitudinal length. Thus, the external electrodes 401a and 401b completely overlap the supports 501, 502, 503, and 504. As a result, a sufficient current required for driving the quadrangular lamps 401 is supplied through the extended external electrodes 401a and 401b without reducing a light-emitting area. In addition, since a high-high voltage can be applied to the quadrangular lamps 401 through the external electrodes 401a and 401b having the extended longitudinal length, a drive voltage is lowered and a resultant heat emission is reduced.

Although not shown, the quadrangular lamps 401 are parts of a backlight unit. In addition, such a backlight unit may be included in a liquid crystal display device having a liquid crystal display panel. Such a liquid crystal display panel may have two substrates attached to each other and sandwiching a liquid crystal layer therebetween. One of the two substrates may be an TFT array substrate, and another of the two substrates may be a color filter substrate.

Figure 7:
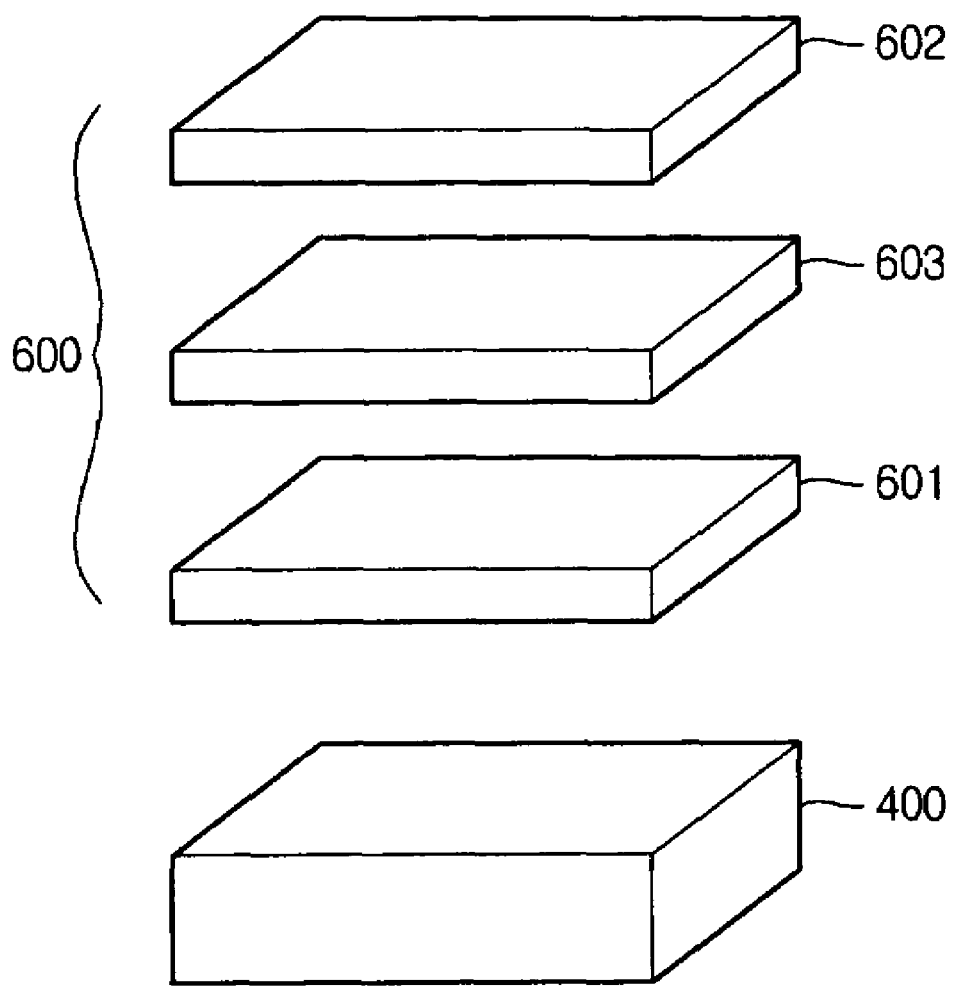
FIG. 7 is an exploded side view schematically illustrating a direct type backlight unit from a back side of a liquid crystal display panel.

Although not shown, the quadrangular lamps 401 are parts of a backlight unit. As shown in FIG. 7, such a backlight unit 400 may be included in a liquid crystal display device having a liquid crystal display panel 600. Such a liquid crystal display panel 600 may have two substrates 601 and 602 attached to each other and sandwiching a liquid crystal layer 603 therebetween. One of the two substrates may be an TFT array substrate, and another of the two substrates may be a color filter substrate.

Moreover, the backlight unit and the LCD device having the same according to an embodiment of the present invention also include a bezel having a reduced width and an increased longitudinal length, thereby effectively preventing light leakage occurring at the edge of the backlight unit. Further, it is possible to drive the LCD device by applying a high-low voltage and a high-high voltage on the external electrode of the lamp, and particularly, to lower a drive voltage by applying a high-high voltage so that heat emission produced from the lamp can be minimized.

It will be apparent to those skilled in the art that various modifications and variations can be made in the direct type backlight unit and a liquid crystal display device having the same of the present invention without departing from the spirit or scope of the invention. Thus, it is intended that the present invention covers the modifications and variations of this invention provided they come within the scope of the appended claims and their equivalents.

What is claimed is:

1. A backlight unit, comprising:
   a plurality of lamps, each of the lamps having a quadrangular shaped lamp tube and an external electrode connected to two short sides thereof, respectively; and
   a bottom cover holding the plurality of lamps.

2. The backlight unit according to claim 1, wherein each of the external electrodes has a width smaller than its longitudinal length.

3. The backlight unit according to claim 1, further comprising:
   a first lower support, a second lower support, a first upper support, and a second upper support, each having a plurality of grooves for receiving the short sides of the lamps.

4. The backlight unit according to claim 3, wherein the external electrodes are completely covered by the supports.

5. The backlight unit according to claim 3, wherein the grooves formed in the first supports and the second supports are coupled to secure the lamps, respectively.

6. The backlight unit according to claim 3, wherein the first supports and the second supports have a conductive layer for supplying power to the lamps.

7. The backlight unit according to claim 1, wherein the lamps are external electrode fluorescent lamps (EEFLs).

8. The backlight unit according to claim 1, wherein a high-high voltage is applied to each of the external electrodes to drive the lamps.

9. The backlight unit according to claim 1, further comprising:
   a reflection sheet disposed under the lamps for reflecting light from the lamps to a front side of the backlight unit; and
   at least one optical sheet disposed above the lamps for scattering and condensing light from the lamps and light reflected from the reflection sheet.

10. A liquid crystal display device, comprising:
    a liquid crystal display panel including an upper substrate, a lower substrate attached to the upper substrate, and a liquid crystal layer between the upper and lower substrates;
    a backlight unit disposed at a back side of the liquid crystal display panel, the backlight unit including a plurality of lamps, each of the lamps having a quadrangular shaped lamp tube and an external electrode connected to two short sides thereof, respectively; and
    a bottom cover holding the plurality of lamps.

11. The liquid crystal display device according to claim 10, wherein each of the external electrodes has a width smaller than its longitudinal length.

12. The liquid crystal display device according to claim 10, further comprising:
    a first lower support, a second lower support, a first upper support, and a second upper support, each having a plurality of grooves for receiving the short sides of the lamps.

13. The liquid crystal display device according to claim 12, wherein the external electrodes are completely covered by the supports.

14. The liquid crystal display device according to claim 12, wherein the grooves formed in the first supports and the second supports are coupled to secure the lamps respectively.

15. The liquid crystal display device according to claim 12, wherein the first supports and the second supports have a conductive layer for supplying power to the lamps.

16. The liquid crystal display device according to claim 10, wherein the lamps are external electrode fluorescent lamps (EEFLs).

17. The liquid crystal display device according to claim 10, wherein a high-high voltage is applied to each of the external electrodes to drive the lamps.

18. The liquid crystal display device according to claim 10, further comprising:

a reflection sheet disposed under the lamps for reflecting light from the lamps to a front side of the backlight unit; and at least one optical sheet disposed above the lamps for scattering and condensing light from the lamps and light reflected from the reflection sheet.

* * * * *